United States Patent
Gurbuz

(10) Patent No.: US 10,133,927 B2
(45) Date of Patent: Nov. 20, 2018

(54) METHOD AND SYSTEM FOR PROCESSING VIDEO CONTENT

(71) Applicant: SONY CORPORATION, Tokyo (JP)

(72) Inventor: Sabri Gurbuz, Campbell, CA (US)

(73) Assignee: SONY CORPORATION, Tokyo (JP)

( * ) Notice: Subject to any disclaimer, the term of this patent is extended or adjusted under 35 U.S.C. 154(b) by 226 days.

(21) Appl. No.: 14/542,294

(22) Filed: Nov. 14, 2014

(65) Prior Publication Data

US 2016/0140392 A1  May 19, 2016

(51) Int. Cl.
| | |
|---|---|
| *G06K 9/00* | (2006.01) |
| *G06T 11/00* | (2006.01) |
| *G06K 9/46* | (2006.01) |
| *G06K 9/62* | (2006.01) |
| *G06K 9/32* | (2006.01) |
| *G06T 7/12* | (2017.01) |
| *G06T 7/215* | (2017.01) |
| *G06T 7/254* | (2017.01) |

(52) U.S. Cl.
CPC ....... *G06K 9/00624* (2013.01); *G06K 9/3241* (2013.01); *G06K 9/46* (2013.01); *G06K 9/4604* (2013.01); *G06K 9/6215* (2013.01); *G06T 7/12* (2017.01); *G06T 7/215* (2017.01); *G06T 7/254* (2017.01); *G06T 11/00* (2013.01); *G06K 2009/4666* (2013.01)

(58) Field of Classification Search
CPC .... G06K 9/00624; G06K 9/3241; G06K 9/46; G06K 9/4604; G06K 9/6215; G06K 2009/4666; G06T 7/0083; G06T 7/2006; G06T 7/2053; G06T 11/00
See application file for complete search history.

(56) References Cited

U.S. PATENT DOCUMENTS

| | | | | |
|---|---|---|---|---|
| 7,095,786 | B1 * | 8/2006 | Schonfeld | H04N 19/51 375/240.16 |
| 7,142,600 | B1 * | 11/2006 | Schonfeld | H04N 19/51 375/240.16 |
| 7,190,832 | B2 | 3/2007 | Frost et al. | |
| 8,358,876 | B1 * | 1/2013 | Gilra | G06T 3/0012 345/418 |
| 8,379,972 | B1 * | 2/2013 | Wang | G06K 9/00 382/162 |

(Continued)

FOREIGN PATENT DOCUMENTS

| | | |
|---|---|---|
| CN | 102970528 A | 3/2013 |
| GB | 2426137 A | 11/2006 |

(Continued)

OTHER PUBLICATIONS

Partial European Search Report received for European Patent Application No. 15194380.0, dated May 3, 2016, p. 7.

(Continued)

*Primary Examiner* — Jonathan S Lee
(74) *Attorney, Agent, or Firm* — Chip Law Group

(57) ABSTRACT

Various aspects of a method and system to process video content for extraction of moving objects from image sequences of the video content are disclosed herein. In an embodiment, the method includes determination of one or more object contours of one or more moving objects in the video content. A first object bounding box (OBB) that encompasses a first object contour of a first moving object is created based on the determined one or more object contours. A first object mask for the first moving object is generated in a first destination image frame, based on infilling of the first object contour in the created first OBB.

19 Claims, 9 Drawing Sheets

(56) References Cited

U.S. PATENT DOCUMENTS

| | | | |
|---|---|---|---|
| 8,401,305 B2 | 3/2013 | Kido | |
| 8,538,082 B2* | 9/2013 | Zhao | G06K 9/00785 382/103 |
| 2006/0177133 A1* | 8/2006 | Kee | G06T 7/12 382/173 |
| 2006/0262960 A1* | 11/2006 | Le Clerc | G06K 9/32 382/103 |
| 2007/0285575 A1* | 12/2007 | Gloudemans, II | G06T 7/0081 348/587 |
| 2008/0187219 A1* | 8/2008 | Chen | G06K 9/00711 382/173 |
| 2009/0310823 A1* | 12/2009 | Cherng | G06K 9/4642 382/103 |
| 2009/0315996 A1* | 12/2009 | Guler | G01S 3/7864 348/169 |
| 2011/0002555 A1* | 1/2011 | Sodagar | G06K 9/38 382/266 |
| 2011/0058708 A1* | 3/2011 | Ikenoue | G06T 7/2046 382/103 |
| 2011/0216965 A1* | 9/2011 | Rother | G06K 9/62 382/159 |
| 2011/0274336 A1* | 11/2011 | Nielsen | G06K 9/0014 382/133 |
| 2012/0213432 A1* | 8/2012 | Wang | G06T 7/12 382/164 |
| 2014/0313216 A1* | 10/2014 | Steingrimsson | G06K 9/00402 345/589 |
| 2015/0062115 A1* | 3/2015 | Asente | G06T 11/203 345/419 |
| 2015/0317519 A1* | 11/2015 | Gurbuz | G06T 7/2053 382/103 |
| 2016/0377698 A1* | 12/2016 | Nielsen | G01S 5/0294 342/450 |
| 2018/0033152 A1* | 2/2018 | Chen | G06K 9/00711 |

FOREIGN PATENT DOCUMENTS

| | | |
|---|---|---|
| JP | 2000-082145 A | 3/2000 |
| JP | 2004-118578 A | 4/2004 |
| JP | 2006-078451 A | 3/2006 |
| JP | 2006-318474 A | 11/2006 |
| JP | 2010062610 A | 3/2010 |
| JP | 2011-186719 A | 9/2011 |
| WO | 2007/076890 A1 | 7/2007 |

OTHER PUBLICATIONS

Rita Cucchiara et al., "Image Analysis and Rule-Based Reasoning for a Traffic Monitoring System", IEEE Transactions on Intelligent Transportation Systems, vol. 1, No. 2, Jun. 2000, pp. 119-130.
Mingwu Ren, et al. "A New and Fast Contour-Filling Algorithm", Pattern Recognition, vol. 38, Issue 12, Dec. 2005, pp. 2564-2577, "http://www.sciencedirect.com/science/article/pii/S0031320305002116", Elsevier Ltd.
A. Criminisi, et al., "Region Filling and Object Removal by Exemplar-Based Image Inpainting", IEEE Transactions on Image Processing, vol. 13, No. 9, Sep. 2004, pp. 1-13.
Chih-Hung Ling, et al., "Virtual Contour Guided Video Object Inpainting Using Posture Mapping and Retrieval", IEEE Transactions on Multimedia, vol. 13, Issue 2, Apr. 2011, pp. 292-302, "http://www.researchgate.net/publication/224197865_virtual_contour_guided_video_object_inpainting_using_posture_mapping_and_retrieval.com".
Extended European Search Report for EP Patent Application No. 15194380.0, dated Sep. 1, 2016, 15 pages.
Teutsch, et al., "Detection, Segmentation, and Tracking of Moving Objects in UAV Videos", IEEE Ninth International Conference on Advanced Video and Signal-Based Surveillance, 2012, pp. 313-318.
Office Action for JP Patent Application No. 2015-218393, dated Oct. 24, 2016, 3 pages of Office Action and 2 pages of English Translation.
Sakuma, et al., "Intruded Object Detection Method Using Inter-Frame Difference", technical reports of the Institute of Television Engineers of Japan, the Institute of Television Engineers of Japan, vol. 14, No. 49, Oct. 21, 1990, Oct. 21, 1990, pp. 01-06.
Isao Masuda, "Time-series image measurements", systems/control/information, Japan, the Institute of Systems, Control and information Engineers.

* cited by examiner

METHOD AND SYSTEM FOR PROCESSING VIDEO CONTENT

FIELD

Various embodiments of the disclosure relate to processing of video content. More specifically, various embodiments of the disclosure relate to processing of video content for extraction of moving objects from image sequences of the video content.

BACKGROUND

Advancements in the field of video processing have revolutionized the digital imaging industry, and its associated devices and imaging applications. Devices, such as a digital camera or a smartphone, may have functionalities that may allow for a video or image sequence to be processed to create a new type of media. New types of media may include a new type of photograph and/or motion picture.

In certain scenarios, the new type of media may be created based on the extraction of one or more moving objects from the image sequences of the video content. One of the many operations performed in such video processing may include fine boundary extraction of object(s) that appear to be in a moving state in the video. However, it may be difficult to generate a fine object boundary mask(s) for such moving object(s) for extraction of the moving object(s) from such image sequences.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A method and system to process video content substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
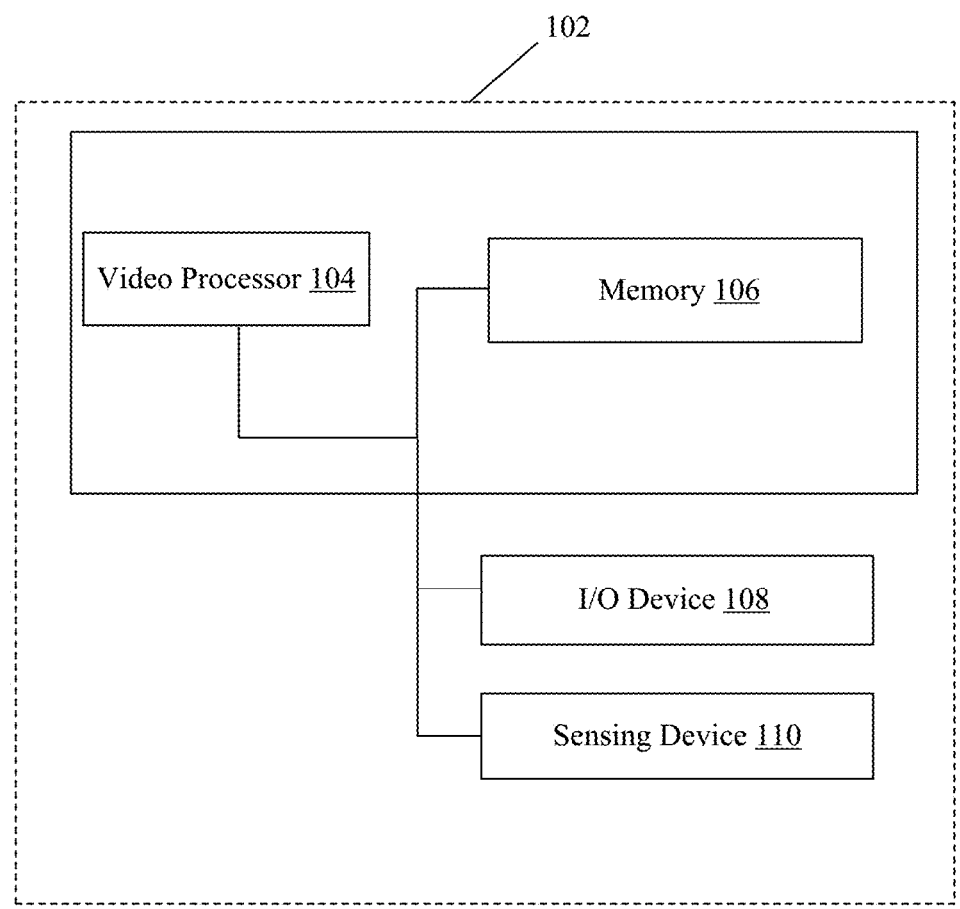
FIG. 1 is a block diagram that illustrates an exemplary video processing device, in accordance with an embodiment of the disclosure.

The following described implementations may be found in disclosed method and system that processes video content. Exemplary aspects of the disclosure may comprise a method that may determine one or more object contours of one or more moving objects in a video content. A first object bounding box (OBB) that may encompass a first object contour of a first moving object may be created. Such creation of the OBB may occur based on the determined one or more object contours. A first object mask for the first moving object may be dynamically generated in a first destination image frame. Such generation of the first object mask may occur based on infilling of the first object contour in the created first OBB.

In an embodiment, the method may comprise detection of the one or more moving objects based on three consecutive image frames of the video content. The three consecutive image frames may comprise a previous image frame, a current image frame, and a next image frame.

In an embodiment, the method may comprise alignment of the current image frame to the previous image frame. In an embodiment, the method may further comprise alignment of the next image frame to the current image frame.

In an embodiment, the method may comprise determination of a first absolute difference image between the aligned current image frame and the previous image frame. In an embodiment, the method may further comprise determination of a second absolute difference image between the aligned next image frame and the current image frame.

In an embodiment, the method may comprise detection of the one or more object contours that corresponds to the one or more moving objects. Such a detection may occur in the determined first absolute difference image and the second absolute difference image.

In an embodiment, the method may comprise determination of a first object contour image based on the detected one or more object contours in the first absolute difference image. In an embodiment, the method may further comprise determination of a second object contour image based on the detected one or more object contours in the second absolute difference image.

In an embodiment, the method may comprise determination of an intermediate object contour image based on an intersection between the generated first object contour image and the second object contour image. In an embodiment, the method may comprise utilization of the determined intermediate object contour image and a gradient information associated with the intermediate object contour image. Such utilization may occur for the determination of the one or more object contours of the one or more moving objects.

In an embodiment, the method may comprise setting of a first pixel value in the first destination image frame. In an embodiment, the method may comprise extraction of color attributes from the determined one or more object contours. Such an extraction may set a second pixel value in the determined one or more object contours.

In an embodiment, the method may comprise copying of the created first OBB to the first destination image frame at predetermined location. In an embodiment, the method may comprise detection of whether a first pixel in the first OBB has a third pixel value. In an embodiment, the method may further comprise detection of whether a second adjacent pixel in the first destination image frame has the first pixel value.

In an embodiment, the method may comprise assignment of the first pixel value to the detected first pixel when the adjacent second pixel is detected with the first pixel value. In an embodiment, the first pixel value may correspond to a color gray. The second pixel value may correspond to a color white, and the third pixel value may correspond to a color black.

In an embodiment, the method may comprise assignment of the second pixel value to one or more pixels in the first OBB having third pixel value. Such assignment for infilling of the first object contour may occur when two adjacent pixels in the first OBB are not detected in the third pixel value and the first pixel value.

In an embodiment, the method may comprise creation of a second OBB that encompasses a second moving object when a second moving object is detected in the video content. In an embodiment, the method may comprise copying the created second OBB to a second destination image frame at a predetermined location. The second destination frame may correspond to the first destination frame that comprises the generated first object mask of the first moving object.

In an embodiment, the method may comprise generation of a second object mask of the second moving object in the second OBB. The second moving object in the second OBB may be associated with the generated first object mask of the first moving object. In an embodiment, the method may comprise extraction of the first moving object and the second moving object based on the generated first object mask and the second object mask.

FIG. 1 is a block diagram that illustrates an exemplary video processing device, in accordance with an embodiment of the disclosure. With reference to FIG. 1, there is shown a video processing device 102. The video processing device 102 may comprise one or more processors, such as a video processor 104, a memory 106, one or more input/output (I/O) devices, such as an I/O device 108, and one or more sensing devices, such as a sensing device 110. The video processor 104 may be communicatively coupled to the memory 106, the I/O device 108, and the sensing device 110.

The video processing device 102 may comprise suitable logic, circuitry, interfaces, and/or code that may be operable to generate object masks for multiple moving objects, based on an infill of object contours of the moving objects. Examples of the video processing device 102 may include, but are not limited to, a smartphone, a digital camera, a camcorder, a tablet computer, a laptop, a projector, a television, an Internet Protocol Television (IPTV), and/or a Personal Digital Assistant (PDA) device.

The video processor 104 may comprise suitable logic, circuitry, interfaces, and/or code that may be operable to execute a set of instructions stored in the memory 106. The video processor 104 may be operable to process video content that may be received from one or more I/O devices, such as a camera or a camcorder. The video processor 104 may be further operable to retrieve data, such as video content and/or image sequences, stored in the memory 106. The video processor 104 may be implemented based on a number of processor technologies known in the art. Examples of the video processor 104 may be an X86-based processor, a Reduced Instruction Set Computing (RISC) processor, an Application-Specific Integrated Circuit (ASIC) processor, a Complex Instruction Set Computing (CISC) processor, a microprocessor, a microcontroller, and/or other processors.

The memory 106 may comprise suitable logic, circuitry, and/or interfaces that may be operable to store a machine code and/or a computer program with at least one code section executable by the video processor 104. The memory 106 may further be operable to store video content and/or other data. The memory 106 may further be operable to store a video frame buffer of the video content, an image sequence of the video content, operating systems, and associated applications. Examples of implementation of the memory 106 may include, but are not limited to, Random Access Memory (RAM), Read Only Memory (ROM), Hard Disk Drive (HDD), Flash memory, and/or a Secure Digital (SD) card.

The I/O device 108 may comprise suitable logic, circuitry, interfaces, and/or code that may be operable to capture video content and/or images. The I/O device 108 may further be operable to receive an input from one or more users, and provide an output to the one or more users. The I/O device 108 may comprise various input and output devices that may be operable to communicate with the video processor 104. Examples of the input devices may include, but are not limited to, a camera, a camcorder, a touch screen, an input port, a motion sensor, a light sensor, and/or a docking station. Examples of the output devices may include, but are not limited to, a display screen (not shown), and/or a projection screen. The display screen may be operable to render one or more features and/or applications of the video processing device 102. The display screen may be realized through several known technologies such as but not limited to, Liquid Crystal Display (LCD) display, Light Emitting Diode (LED) display, and/or Organic LED (OLED) display technology. The projection screen may be a surface, and/or a holographic screen used to display a projected image and/or video. In an embodiment, the input and output devices may be provided as two separate units.

The sensing device 110 may comprise suitable logic, circuitry, and/or interfaces that may be operable to store a machine code and/or a computer program with at least one code section executable by the video processor 104. The sensing device 110 may comprise one or more sensors, such as image sensors, to aid in the capture of images, video, confirm recognition, identification, and/or verification of the one or more users. The one or more sensors may comprise capacitive-touch sensors used to detect one or more touch-based input actions received from the one or more users.

In operation, the video processor 104 may be operable to receive an image sequence of a video. In an embodiment, the video processor 104 may be operable to downsize image frames from the received image sequence of the video, from a first resolution value to a second resolution value. In an embodiment, the second resolution value may correspond to a video graphics array (VGA) size.

In an embodiment, the video processor 104 may be operable to buffer at least three consecutive downsized image frames of the image sequence in a circular buffer. The three consecutive image frames may comprise a previous image frame, a current image frame, and a next image frame.

In an embodiment, the video processor 104 may be operable to align the current image frame to the previous image frame. The video processor 104 may further be operable to align the next image frame to the current image frame. In an embodiment, the video processor 104 may be operable to determine a first absolute difference image and a second absolute difference image. The determination of the first absolute difference image may be based on the alignment between the current image frame and the previous image frame. The determination of the second absolute difference image may be based on the alignment between the next image frame and the current image frame.

In an embodiment, the video processor 104 may be operable to detect one or more object contours of one or more moving objects in the first absolute difference image. Such detection of one or more object contours may simultaneously occur in the second absolute difference image. In an embodiment, such detection may occur subsequent to removal of non-overlapping regions from the determined first absolute difference image and the determined second absolute difference image. In an embodiment, such detection may occur by use of one or more contour detection algorithms or approaches known in the art. Examples of such contour detection algorithms or approaches may include, but are not limited to, search-based, zero-crossing based, Roberts operator, Prewitt operator, Sobel operator, Canny operator, and/or Laplacian edge detectors. Notwithstanding, the object contour may be detected and refined using any suitable contour detection algorithms or approaches without limiting the scope of the disclosure. For example, in an embodiment, a contour detection algorithm may be implemented by use of a predetermined sensitivity threshold for further detection and refinement of object contours by use of the results of contour detection.

In an embodiment, the video processor 104 may be operable to determine a first object contour image, based on the detected one or more object contours in the determined first absolute difference image. Similarly, the video processor 104 may be operable to simultaneously determine a second object contour image in the determined second absolute difference image.

In an embodiment, the video processor 104 may be operable to determine an intermediate object contour image based on an intersection between the detected first object contour image and the second object contour image. In an embodiment, the intermediate object contour image may correspond to the current image frame with removed non-overlapping regions.

In an embodiment, the video processor 104 may be operable to calculate gradient information, such as the Sobel gradient, in the intermediate object contour image. Such a calculation may occur in an instance when object contour information is absent in one or more object contour portions of the intermediate object contour image. In such an instance, the video processor 104 may be operable to recover object contour information in the one or more object contour portions. Such recovery of the one or more object contour portions may utilize a gradient tracing operation. The gradient information and the determined intermediate object contour image may be used as input for gradient tracing operation.

In an embodiment, the video processor 104 may be operable to determine one or more object contours that correspond to one or more moving objects. Such a determination may utilize the object contour information of the intermediate object contour image and the gradient information associated with the intermediate object contour image.

In an embodiment, the video processor 104 may be operable to detect one or more moving objects based on the determined one or more object contours. In an embodiment, the video processor 104 may be operable to create a first OBB that encompasses a first object contour of a first moving object. Such creation of the first OBB may be based on the determined one or more object contours.

In an embodiment, the video processor 104 may be operable to set a first pixel value in a first destination image frame. In an embodiment, the first destination image frame may be an image frame other than the received image sequence of the video. In an embodiment, the first destination image frame may be of similar size and resolution as of the downsized current image frame.

In an embodiment, the video processor 104 may be operable to extract color attributes from the determined one or more object contours such that a second pixel value is set in the determined one or more object contours. In an embodiment, the video processor 104 may be operable to copy the created first OBB to the first destination image frame at a predetermined location.

In an embodiment, the video processor 104 may be operable to detect whether a first pixel in the first OBB has a third pixel value. In an embodiment, the video processor 104 may further detect whether a second pixel, adjacent to the first pixel in the first destination image frame, has a first pixel value. In an embodiment, the video processor 104 may be operable to assign the first pixel value to the detected first pixel when the adjacent second pixel is also detected with the first pixel value. In an embodiment, the first pixel value, the second pixel value, and the third pixel value may correspond to a color gray, a color white, and a color black, respectively.

In an embodiment, the video processor 104 may be operable to assign the second pixel value to one or more pixels in the first OBB that may actually have third pixel value. Such assignment of the second pixel value may occur when two adjacent pixels in the first OBB are not detected to have the first pixel value and the third pixel value, respectively. In other words, such assignment may occur when all pixels outside the first object contour are assigned the first pixel value, such as the color gray. The assignment of the second pixel value may correspond to the infilling of the first object contour in the first OBB.

In an embodiment, the video processor 104 may be operable to dynamically generate a first object mask for the first moving object. Such generation of the first object mask may occur in the first destination image frame, based on the infilling of the object contour of the first moving object in the first OBB.

In an embodiment, the video processor 104 may be operable to create a second OBB when a second moving object is detected in the three consecutive image frames. The second OBB may encompass a second object contour of a second moving object. The second OBB may be created based on the determined one or more object contours of the one or more moving objects.

In an embodiment, the video processor 104 may be operable to copy the created second OBB to a second destination image frame at a predetermined location. The second destination image frame may correspond to the first destination image frame that may comprise the generated first object mask for the first moving object.

In an embodiment, the video processor 104 may be operable to generate a second object mask of the second moving object in the second OBB. The second moving object in the second OBB may be associated with the generated first object mask of the first moving object. In an embodiment, the video processor 104 may be operable to extract the first moving object and the second moving object, based on the generated first object mask and the second object mask.

In an embodiment, the first pixel value, the second pixel value, and the third pixel value may correspond to the color gray, the color black, and the color white, respectively. It will be appreciated that embodiments of the present disclosure may use more than three consecutive image frames of the received image sequence. This may increase the robustness of the disclosed method and system. For example, in an embodiment, five consecutive image frames of the image sequence may be utilized. In such an embodiment, the video processor 104 may be operable to align the first image frame, of the five consecutive image frames, to the third image frame. Similarly, the video processor 104 may be operable to align the fifth image frame to the third image frame. In such an embodiment, the first image frame may correspond to the previous image frame. The third image frame may correspond to the current image frame. The fifth image frame may correspond to the next image frame, as described above. Similarly, the video processor 104 may be operable to determine the first absolute difference image between the aligned first image frame and the third image frame. The video processor 104 may further be operable to determine the second absolute difference image between the aligned fifth image frame and the third image frame.

In an embodiment, the downsize operation of the image frames from the received image sequence may refer to the re-sizing of the image frames. Re-sizing may be from a high resolution value (such as high-definition (HD)), to a low resolution value (VGA). In an embodiment, the alignment between the consecutive image frames may use one or more alignment algorithms known in the art, such as a global whole frame image alignment algorithm, an intensity-based alignment algorithm, and/or a feature-based alignment algorithm.

In an embodiment, the alignment between the previous image frame and the current image frame may be with respect to static scenes in the image frames. Similarly, the alignment between the next image frame and the current image frame may be with respect to static scenes in the image frames. In an embodiment, the static scenes may comprise views of the one or more moving objects.

In an embodiment, the video processor 104 may be operable to remove non-overlapping regions from the determined first absolute difference image and the determined second absolute difference image. In an embodiment, the video processor 104 may be operable to remove the non-overlapping regions when the determination of the first absolute difference image may occur. The non-overlapping regions may be non-corresponding redundant regions. For example, a video camera may capture a video. The camera may move towards the right where a partially new scene may be captured that may not be present in the previous frame. Subsequently, when the previous and current frames are aligned, there may not be a correspondence scene at the frame border due to non-overlapping of the camera field of view. The above action defines the "non-overlapping" regions after the alignment.

In an embodiment, the video processor 104 may be operable to extract the first moving object and the second moving object by use of another three consecutive image sequences, which may occur at another time period of the video. Such extraction of moving objects at different time periods may be used to create animations. The generated object masks may be uniform due to the infilling of the object contours, as described above. The dynamic generation of fine boundary and uniform object masks may enable quick extraction of the moving objects from the image sequences. Such extraction of the moving objects from the image sequences of the video content may be used in a movie production house, such as to process the video to create various animations. For example, animated images may be created with special effects and expressions for moving objects, such as in action scenes that involves sports, vehicles, and other moving objects.

In an embodiment, the video processor 104 may be operable to receive the image sequence of the video from a remote server (not shown). In an embodiment, the video processor 104 may be operable to receive the image sequence of the video from the I/O device 108 that may be remotely located.

Figure 2A:
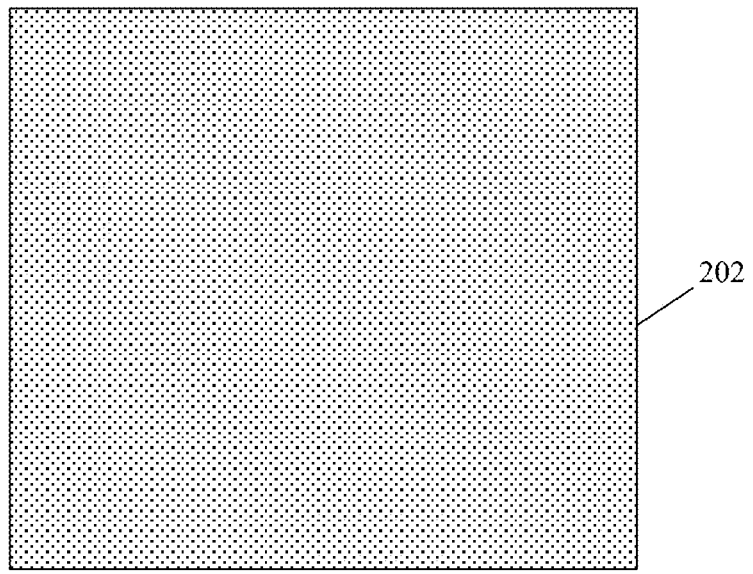
FIGS. 2A, 2B, and 2C illustrate a first exemplary scenario for the implementation of the disclosed method and system that processes video content, in accordance with an embodiment of the disclosure.
Figure 2A:
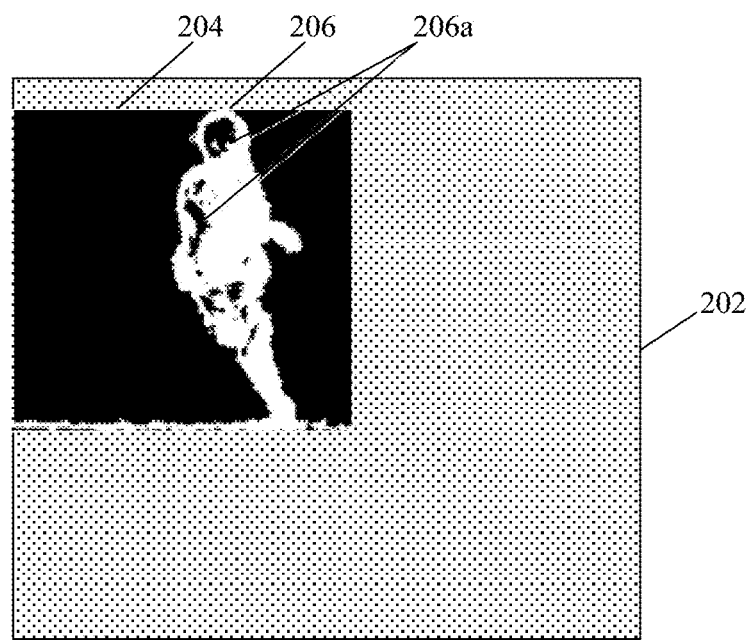
Figure 2B:
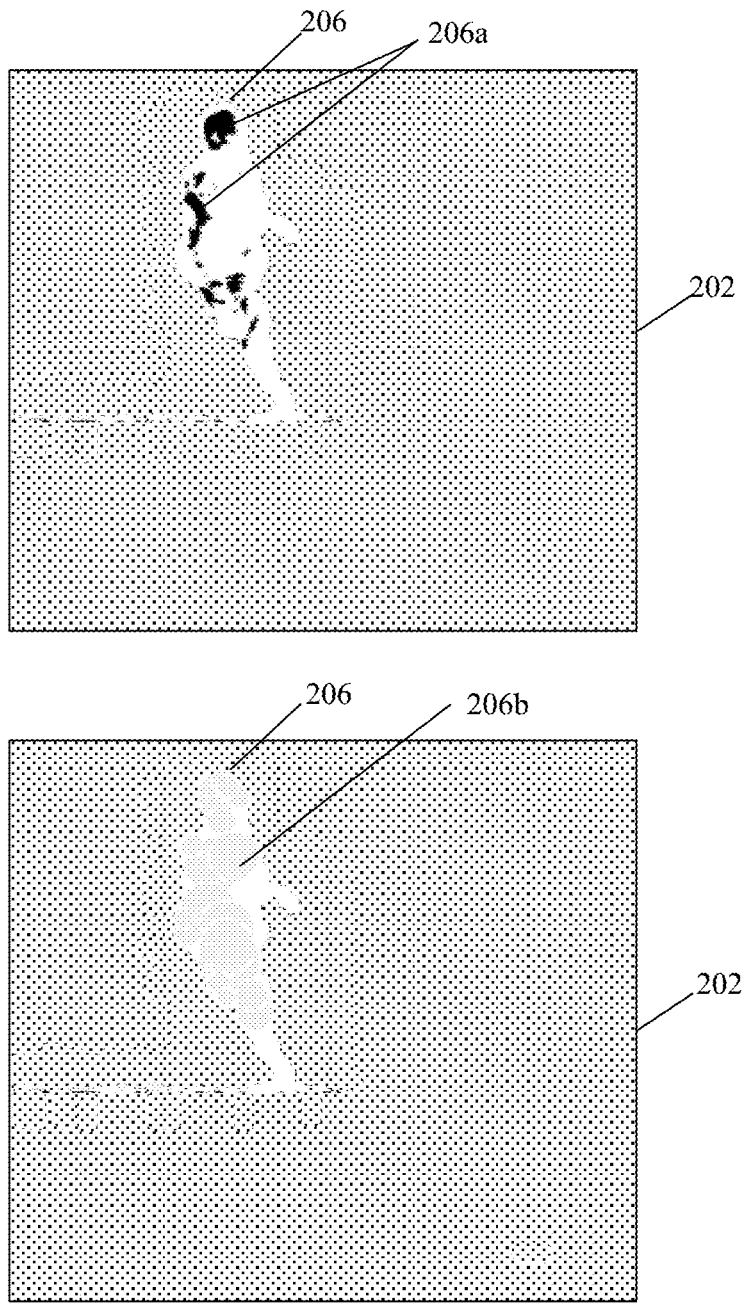
Figure 2C:
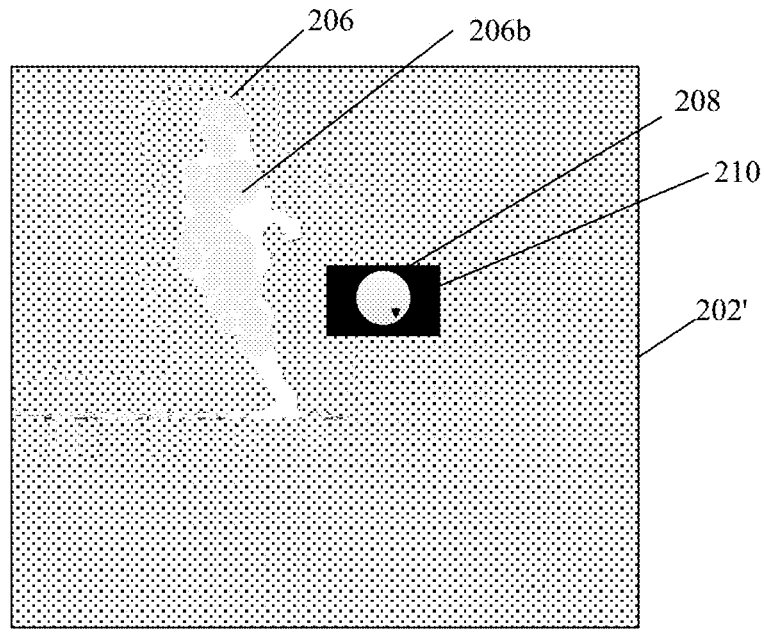
Figure 2C:
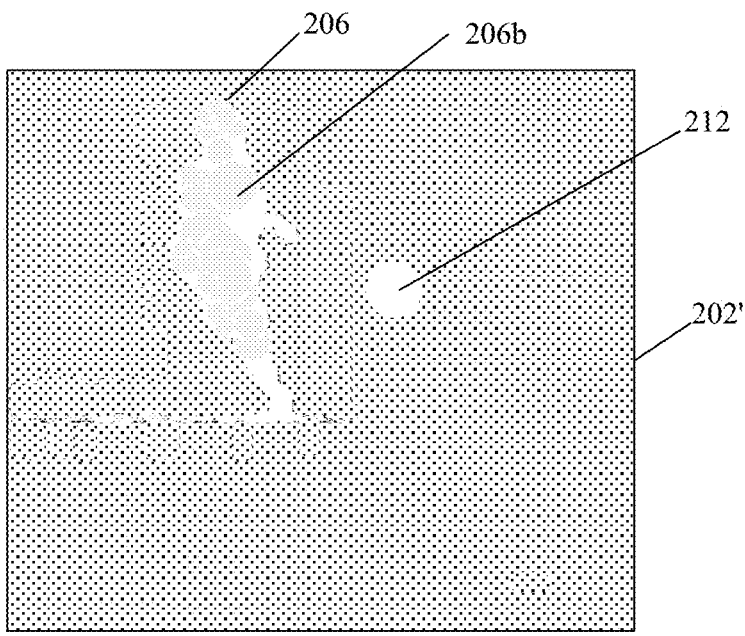

FIGS. 2A, 2B and 2C illustrate a first exemplary scenario for implementation of the disclosed method and system that processes video content, in accordance with an embodiment of the disclosure. FIGS. 2A, 2B and 2C are explained in conjunction with elements from FIG. 1. With reference to FIG. 2A, there is shown a first destination image frame 202 and a first OBB 204. The first OBB 204 may comprise a first object contour 206 of a first moving object. There is further shown one or more regions, such as regions 206a, within the first object contour 206.

In accordance with the first exemplary scenario, the first destination image frame 202 may be an image frame pre-stored in the memory 106. The video processor 104 may be operable to set the first pixel value, such as gray, to all pixels in the first destination image frame. The first OBB 204 may correspond to the created OBB that encompasses the first moving object. The first object contour 206 may correspond to the determined first object contour of the first moving object. The video processor 104 may be operable to extract color attributes from the first object contour 206. In such an extraction, the second pixel value, such as white, may be set to the first object contour 206. Further, the regions 206a within the first object contour 206, and a rectangular area outside the first object contour 206 in the first OBB 204 may also be set in the third pixel value, such as black. The regions 206a within the first object contour 206 may require to be infilled with the second pixel value to generate a uniform object mask for the first moving object, such as a moving person (as shown).

In operation, the video processor 104 may be operable to copy the first OBB 204 to the first destination image frame 202, at a predetermined location. For example, such a copy operation may be performed by use of a copy command, such as "memcpy" command. The "memcpy" command may retain the information of the first OBB 204, when the first OBB 204 is copied from the source to the first destination image frame 202. Such retained information may correspond to pixel values and location information (such as pixel coordinates information) of the first OBB 204. The source may refer to the determined intermediate object contour image that corresponds to the current image frame of the video content.

With reference to FIG. 2B, there is shown the first destination image frame 202, the first OBB 204, and the first object contour 206 of the first moving object in the first OBB 204, in accordance with the operation sequence of the first exemplary scenario of FIG. 2A. There is further shown a first object mask 206b.

In an embodiment, the video processor 104 may be operable to detect pixel values of two pixels in the first destination image frame 202. For example, the video processor 104 may be operable to detect whether a first pixel in the first OBB 204 has the third pixel value. The video processor 104 may further detect whether an adjacent second pixel in the first destination image frame 202 has the first pixel value. In an embodiment, the video processor 104 may be operable to assign the first pixel value to the detected first pixel in the first OBB 204. Such assignment of the first pixel value (such as gray) occurs when the adjacent second pixel is detected with the first pixel value.

In an embodiment, such detection and assignment may begin from a boundary pixel of the first OBB 204. Such detection and assignment may proceed towards one or more directions until all pixels in the first OBB 204, outside the first object contour 206, are assigned the first pixel value. For example, such detection and assignment may proceed iteratively, row by row, from left to right and/or right to left in the first OBB 204. Similarly such detection and assignment may proceed iteratively, column by column, from top to bottom and/or bottom to top. The detection and assignment in a row or a column may start from one end at a boundary pixel of the first OBB 204 and may proceed in the one or more directions to another end of the first OBB 204. The detection and assignment in a row or column may proceed until a pixel with the second pixel value is detected. In other words, such detection and assignment may be performed until the first object contour 206 is encountered that has the second pixel value, such as white.

In an embodiment, the video processor 104 may be operable to assign the second pixel value to one or more pixels in the first OBB 204, which may have the third pixel value. The third pixel value may be in one or more regions, such as the regions 206a, within the first object contour 206. Such assignment occurs when two adjacent pixels in the first OBB 204 are not detected in the third pixel value and the first pixel value. The assignment of the second pixel value may correspond to the infilling of the first object contour 206 in the first OBB 204.

In an embodiment, the video processor 104 may be operable to dynamically generate the first object mask 206b for the first moving object. Such generation of the first object mask 206b may be based on the infilling of the first object contour 206, in the first OBB 204 in the first destination image frame 202.

With reference to FIG. 2C, there is shown a second destination image frame 202', the first object contour 206 of the first moving object, the first object mask 206b, a second OBB 208, a second object contour 210 of a ball, and a second object mask 212 of the ball, in accordance with operation sequence of the first exemplary scenario of FIG. 2B.

The second destination image frame 202' may correspond to the first destination image frame 202 that comprises the first object mask 206b of the first moving object. The second OBB 208 may correspond to the created second OBB 208 (FIG. 1). The second OBB 208 is similar to that of the first OBB 204, with the exception that the second OBB 208 encompasses the ball. The ball may correspond to the second moving object. The area of the OBB's, such as the first OBB 204 and the second OBB 208, may be associated with the size of the objects that lie within the OBB's. The larger the size of the moving object, the larger may be the OBB that encompasses the corresponding moving object.

In an embodiment, the video processor 104 may be operable to copy the second OBB 208 to the second destination image frame 202', at a predetermined location. The predetermined location may correspond to a location of the ball in the current image frame of the three consecutive image frames of the video.

In an embodiment, the video processor 104 may be operable to detect whether a first pixel in the second OBB 208 has the third pixel value. The video processor 104 may further detect whether an adjacent second pixel in the second destination image frame 202' has the first pixel value. In an embodiment, the video processor 104 may be operable to assign the first pixel value to the detected first pixel in the second OBB 208. Such a detection and assignment technique may be similar to that described above for the first OBB 204. In an embodiment, the video processor 104 may be operable to generate the second object mask 212, of the ball in the second OBB 208 in a manner similar to that of the first object mask 202b.

Based on the generated first object mask 206b and the second object mask 212, the first moving object (such as the person), and the ball may be extracted from the three consecutive image sequences of the video content. Such extraction for the first moving object and the ball (second moving object) may occur for another three consecutive image sequences, which may occur at another time period of the video. Such extraction of moving objects at different time periods may be used to create animated images with special effects. For example, the video processor 104 may be operable to overlay the extracted moving objects at different time periods in a digital photograph.

Figure 3:
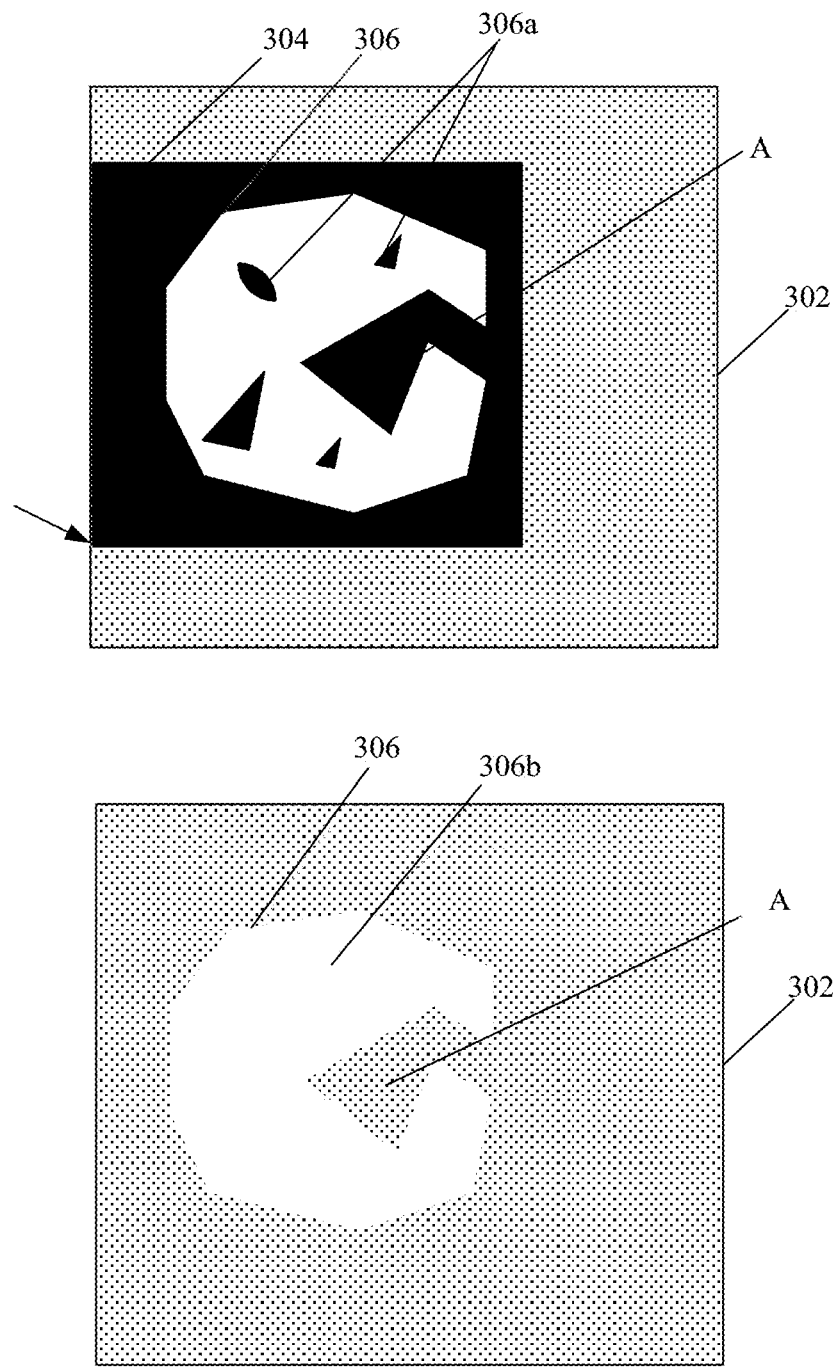
FIG. 3 illustrates a second exemplary scenario for the implementation of the disclosed method and system that processes video content, in accordance with an embodiment of the disclosure.

FIG. 3 illustrates a second exemplary scenario for the implementation of the disclosed method and system that processes video content, in accordance with an embodiment of the disclosure. FIG. 3 is explained in conjunction with elements from FIG. 1. With reference to FIG. 1, there is shown a destination image frame 302, an OBB 304, an object contour 306 of an arbitrary-shaped object, regions 306a within the object contour 306 having pixels in a black color, and an object mask 306b of the arbitrary-shaped object.

In the second exemplary scenario, the destination image frame 302 may correspond to the first destination image frame. The OBB 304 may correspond to the created first OBB. The object contour 306 of the arbitrary-shaped object may correspond to the first object contour of the first moving object. The arbitrary-shaped object may comprise one or more areas that may be difficult to access. For example, a groove-like area, "A", outside the object contour 306 that resembles the letter, "G", of the English alphabet.

The video processor 104 may be operable to set the first pixel value, such as gray, in the destination image frame 302. For example, all the pixels of the destination image frame 302 may be set to a gray background value. The video processor 104 may be operable to extract color attributes from the object contour 306, similar to that as explained above. For example, in such extraction, the second pixel value, such as white, may be set to the object contour 306. The regions 306a, within the first object contour 206, and a rectangular area outside the object contour 306 in the OBB 304, may also be set in the third pixel value, such as black. The regions 306a within the object contour 306 may require to be infilled with the second pixel value to generate a uniform object mask for the arbitrary-shaped object.

In an embodiment, the video processor 104 may be operable to detect whether a first pixel in the OBB 304 has a third pixel value, such as black. The video processor 104 may be further operable to detect whether an adjacent second pixel in the destination image frame 302 has the first pixel value. For example, the first pixel may have a pixel coordinate (2,10) (shown by a black arrow mark pointed towards the left and lowermost region of the OBB 304) that corresponds to (x,y) coordinates in a plane. The "x" coordinate may refer to a horizontal axis, and the "y" coordinate may refer to a vertical axis. The adjacent second pixel, may have a pixel coordinate (1,10). In an embodiment, the video processor 104 may be operable to assign the first pixel value to the detected first pixel (2,10) in the first OBB 204, when the adjacent second pixel (1,10) is detected with the first pixel value.

In the above described example, the detection may proceed to a consecutive pixel (3,10) in the OBB 304, which may have the third pixel value. The detected first pixel (2,10) adjacent to consecutive pixel (3,10), now may have the first pixel value as a consequence of the assignment. Thus, the video processor 104 may be operable to assign the first pixel value to the detected consecutive pixel (3,10) in the OBB 304, when the first pixel (2,10) is detected with the first pixel value.

As described above, such detection and assignment may proceed iteratively towards one or more directions until all pixels in the OBB 304 outside the object contour 306 are assigned the first pixel value. In instances where some areas, such as the area, "A", are left-out in a first iteration, the detection and assignment operations may resume in a second iteration. Such detection and assignment may occur whenever two adjacent pixels in the OBB 304 are detected in the third pixel value and the first pixel value, as described above. The second iteration may correspond to a check mechanism to ensure that all pixels in the OBB 304, outside the object contour 306, are assigned the first pixel value.

In an embodiment, the video processor 104 may be operable to assign the second pixel value to one or more pixels with the third pixel value in the OBB 304. The third pixel value may be in the regions 306a within the object contour 306. Such assignment occurs when two adjacent pixels in the OBB 304 are not detected to have the third pixel value and the first pixel value. Based on such assignment, the video processor 104 may be operable to dynamically generate the object mask 306b for the arbitrary-shaped object. The assignment of the second pixel value may correspond to the infilling of the object contour 306, with the second pixel value, such as white, to generate the object mask 306b in uniform color.

Figure 4A:
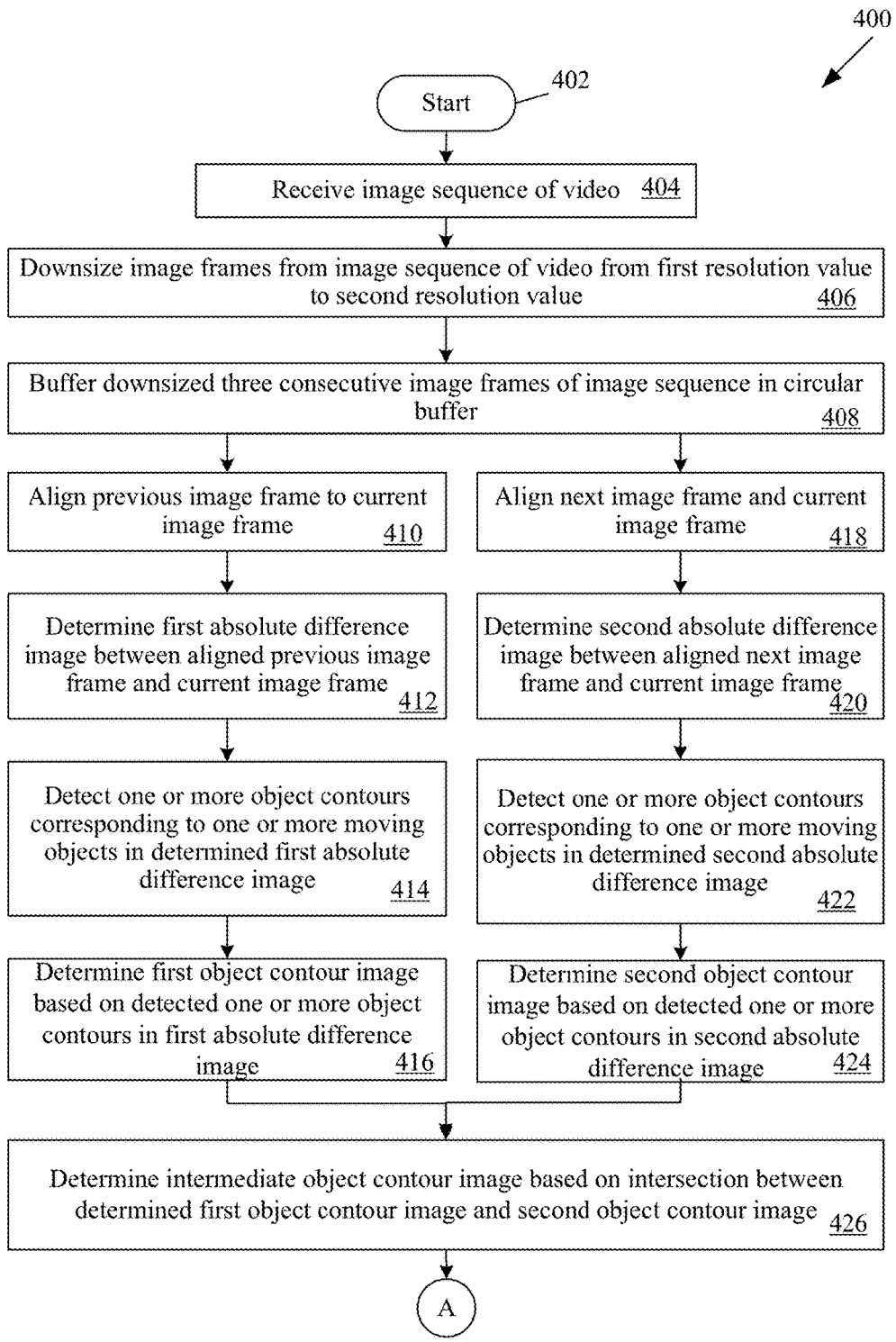
FIGS. 4A, 4B, and 4C are a flow chart that illustrates an exemplary method to process video content, in accordance with an embodiment of the disclosure.
Figure 4B:
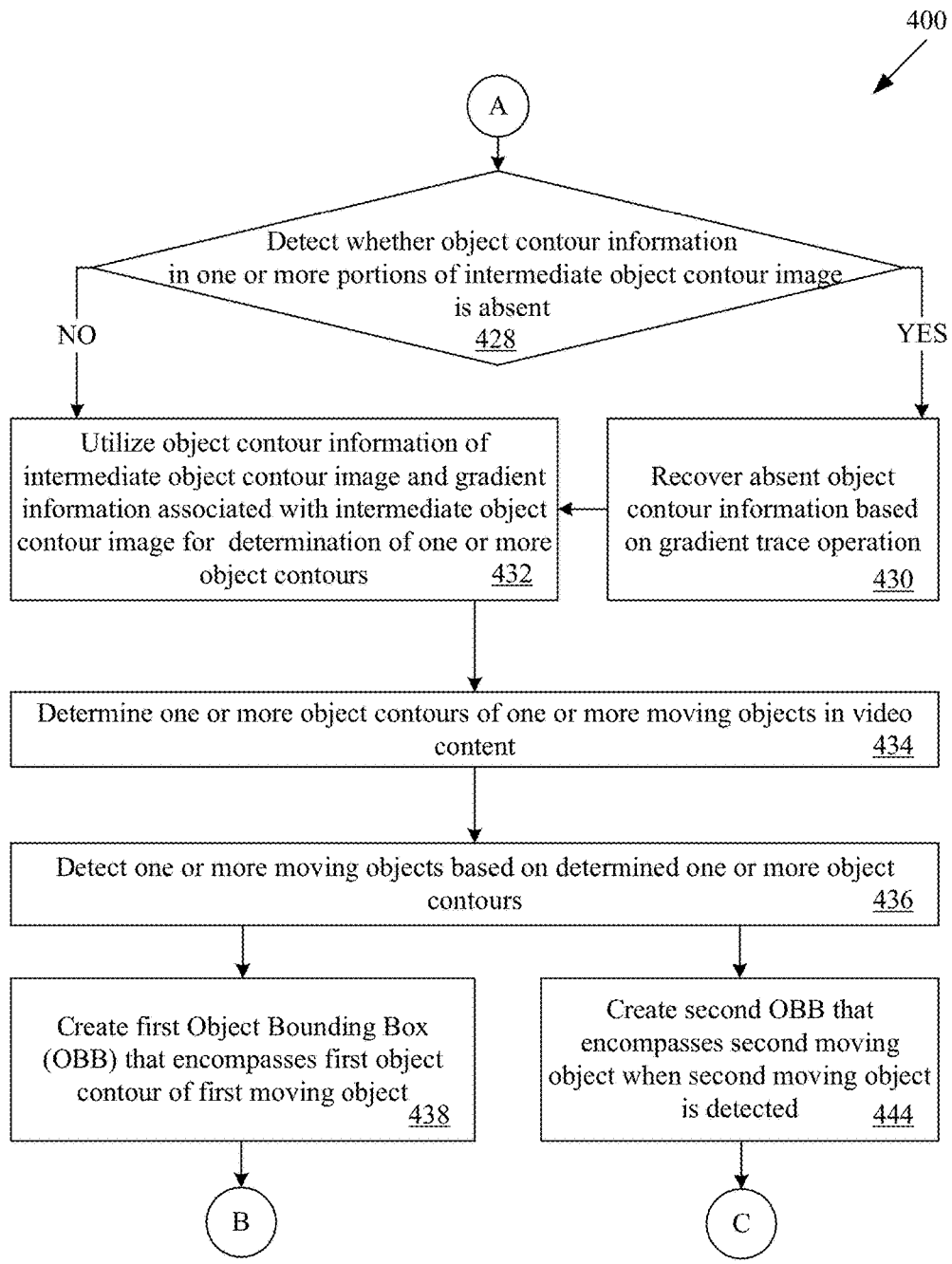
Figure 4C:
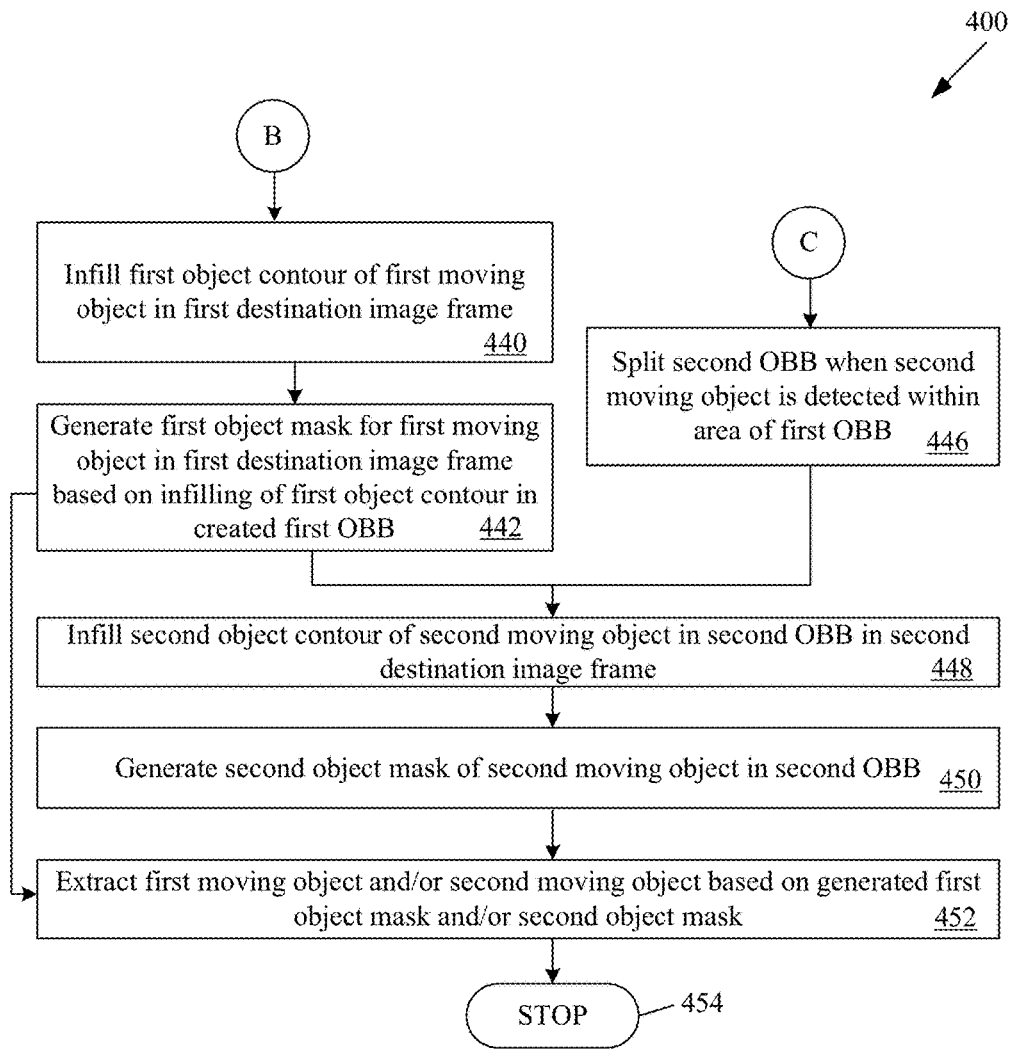

FIGS. 4A, 4B and 4C are a flow chart that illustrates an exemplary method to process video, in accordance with an embodiment of the disclosure. With reference to FIGS. 4A, 4B and 4C there is shown a flow chart 400. The flow chart 400 is described in conjunction with FIG. 1. The method starts at step 402 and proceeds to step 404.

At step 404, an image sequence of a video may be received. At step 406, image frames from the received image sequence of the video may be downsized.

At step 408, the downsized three consecutive image frames of the image sequence may be buffered in a circular buffer. At step 410, a previous image frame may be aligned to a current image frame.

At step 412, a first absolute difference image may be determined between the aligned previous image frame and the current image frame. In an embodiment, non-overlapping regions from the determined first absolute difference image may be removed. In an embodiment, the non-overlapping regions may be simultaneously removed when the first absolute difference image is determined. At step 414, one or more object contours that correspond to the one or more moving objects may be detected in the determined first absolute difference image.

At step 416, a first object contour image may be determined based on the detected one or more object contours in the first absolute difference image. Control may pass to step 418 to step 424, in parallel. At step 418, a next image frame may be aligned to the current image frame.

At step 420, a second absolute difference image may be determined between the aligned next image frame and the current image frame. In an embodiment, non-overlapping regions from the determined second absolute difference image may be removed. In an embodiment, the non-overlapping regions may be simultaneously removed when the second absolute difference image is determined. At step 422, one or more object contours that correspond to the one or more moving objects may be detected in the determined second absolute difference image.

At step 424, a second object contour image may be determined, based on the detected one or more object contours in the second absolute difference image. At step 426, an intermediate object contour image may be determined, based on an intersection between the generated first object contour image, and the second object contour image.

At step 428, it may be determined whether object contour information in one or more portions of intermediate object contour image is absent. In such a case, control passes to step 430. At step 430, the absent object contour information may be recovered based on a gradient tracing operation.

At step 432, the object contour information of the intermediate object contour image, and a gradient information associated with the intermediate object contour image, may be utilized for the determination of the one or more object contours of the one or more moving objects. At step 434, one or more object contours of one or more moving objects may be determined in the video content. Such determination may be based on the determined object contour information and the gradient information associated with the intermediate object contour image.

At step 436, the one or more moving objects may be detected based on the determined one or more object contours. At step 438, a first OBB that encompasses a first object contour of a first moving object may be created based on the determined one or more object contours.

At step 440, the first object contour of the first moving object may be infilled. At step 442, a first object mask for the first moving object may be generated in a first destination image frame based on the infill of the object contour in the created first OBB. Control may pass from step 444 to step 446, in parallel (as shown).

At step 444, when the second moving object is detected, a second OBB may be created that encompasses a second object contour of a second moving object. Such creation of the second OBB may be based on the determined one or more object contours. At step 446, the second OBB may be split when the second object contour of the second moving object is detected within the area of the created first OBB. Additionally, such a spilt may occur when the second object contour is not in contact with the first object contour.

At step 448, the second object contour of the second moving object in the second OBB may be infilled in a second destination image frame. Such a second destination image frame may correspond to the first destination image frame that comprises the generated first object mask for the first moving object. At step 450, a second object mask of the second moving object may be generated in the second OBB.

At step 452, the first moving object and the second moving object may be extracted based on generated first object mask and the second object mask. In instances where the second moving object is not detected, control from step 442 may pass to step 452. Control passes to end step 454.

Figure 5:
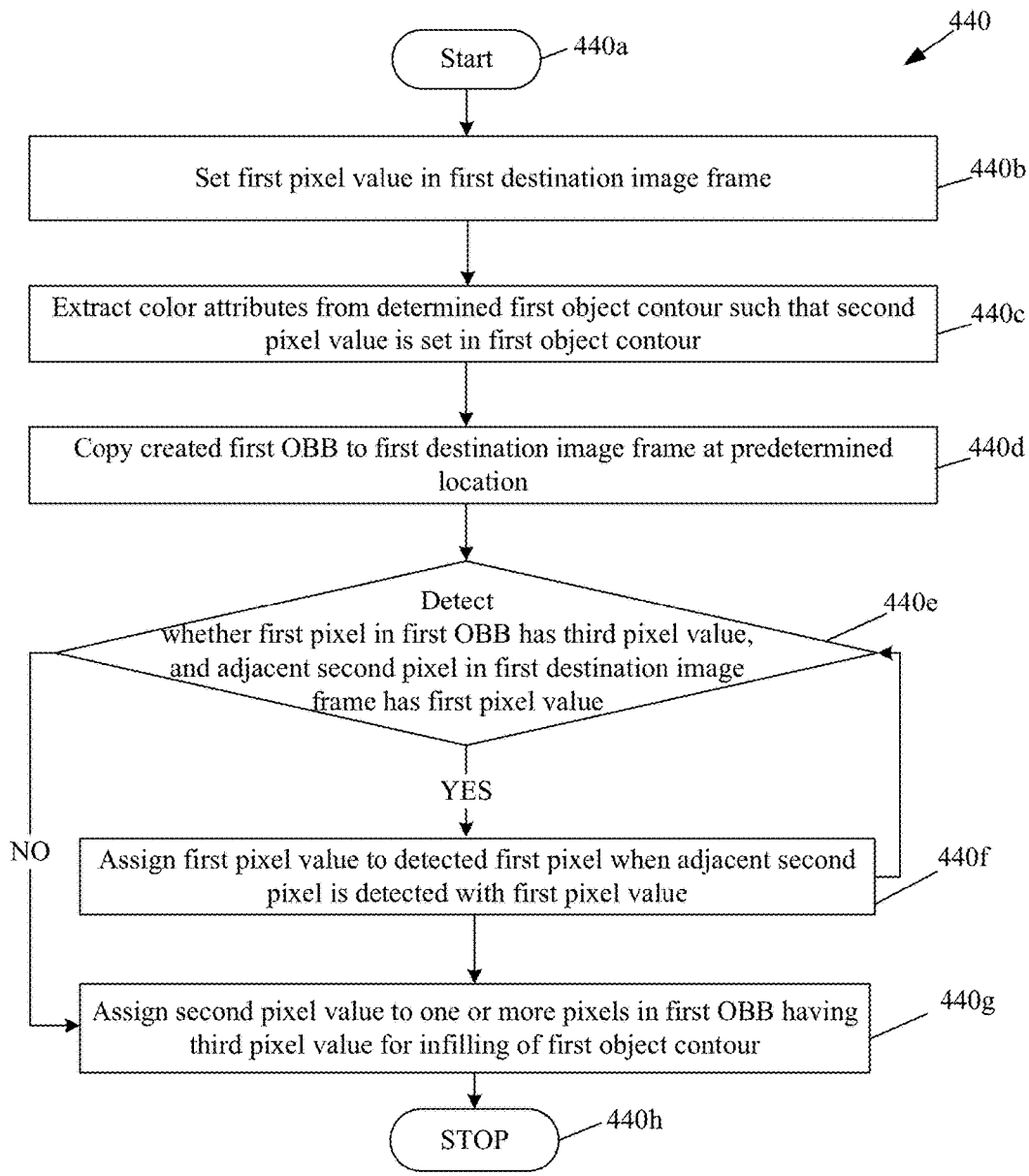
FIG. 5 is a flow chart that illustrates an exemplary infilling technique for the disclosed method to process video content, in accordance with an embodiment of the disclosure.

FIG. 5 is a flow chart that illustrates an exemplary infilling technique of the disclosed method to process video content, in accordance with an embodiment of the disclosure. With reference to FIG. 5, there is shown a flow chart to describe sub-steps of the step 440 of FIG. 4C. The flow chart 440 is described in conjunction with FIG. 1, FIG. 2A, FIG. 2B, FIG. 2C, FIG. 4A, FIG. 4B and FIG. 4C. The flow chart begins at step 440a and proceeds to step 440b.

At step 440b, a first pixel value may be set in a first destination image frame. At step 440c, color attributes may be extracted from the determined first object contour such that a second pixel value is set in the determined first object contour.

At step 440d, the created first OBB may be copied to the first destination image frame at a predetermined location. At step 440e, it is detected whether a first pixel in the first OBB has a third pixel value and an adjacent second pixel in the first destination image frame has the first pixel value. In instances where the first pixel in the first OBB has the third pixel value and the adjacent second pixel has the first pixel value, the control may pass to step 440f.

At step 440f, the first pixel value may be assigned to the detected first pixel when the adjacent second pixel is detected with the first pixel value. The step 440e to 440f may be repeated until the detection and assignment is completed in the first OBB. In instances where the first pixel in the first OBB does not have the third pixel value and the adjacent second pixel has the first pixel value, the control may pass to step 440g.

At step 440g, the second pixel value may be assigned to one or more pixels in the first OBB that has third pixel value. Such assignment of the second pixel value to one or more pixels may cause infilling of the first object contour of the first moving object. Control passes to end step 440h.

In accordance with an embodiment of the disclosure, a system that processes video content is disclosed. A device, such as the video processing device 102 (FIG. 1), may comprise one or more video processors (hereinafter referred to as the video processor 104 (FIG. 1)). The video processor 104 may be operable to determine one or more object contours of one or more moving objects in the video content. The video processor 104 may further be operable to create a first OBB that may encompass a first object contour of a first moving object based on the determined one or more object contours. The video processor 104 may further be operable to dynamically generate a first object mask for the first moving object in a first destination image frame, based on infilling of the first object contour in the created first OBB.

Various embodiments of the disclosure may provide a non-transitory computer readable medium and/or storage medium, and/or a non-transitory machine readable medium and/or storage medium having stored thereon, a machine code and/or a computer program having at least one code section executable by a machine and/or a computer that processes video. The at least one code section in the video processor 104 may cause the machine and/or computer to perform the steps that comprise determination of one or more object contours of one or more moving objects in the video content. A first OBB that may encompass a first object contour of a first moving object may be created based on the determined one or more object contours. A first object mask for the first moving object may be generated in a first destination image frame based on infilling of the first object contour in the created first OBB.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method, comprising:
   in a video processor:
   determining a first object contour of a first moving object in video content;
   creating a first Object Bounding Box (OBB) that encompasses said first object contour of said first moving object;
   dynamically generating a first object mask for said first moving object in a first destination image frame based on infilling of said first object contour in said first OBB, wherein said infilling comprises:
     setting a first pixel value in said first destination image frame;
     extracting color attributes from said first object contour such that a second pixel value is set in said first object contour, wherein said second pixel value is different from said first pixel value,
     wherein said generation of said first object mask comprises:
       detecting a first pixel with a third pixel value in said first OBB;
       detecting a second pixel, adjacent to said first pixel, with said first pixel value in said first destination image frame, wherein said third pixel value is different from said first pixel value and said second pixel value; and
       assigning said first pixel value to said first pixel based on said detection of said second pixel with said first pixel value;
   copying said created first OBB encompassing said first object to said first destination image frame at a first location; and
   extracting said first moving object in said video content based on said first object mask.

2. The method as claimed in claim 1,
wherein said determination of said first object contour comprises detecting said first moving object based on three consecutive image frames of said video content, and
wherein said three consecutive image frames comprise a previous image frame, a current image frame, and a next image frame.

3. The method as claimed in claim 2, wherein said determination of said first object contour further comprises:
aligning said current image frame with said previous image frame, and said next image frame with said current image frame; and
determining a first absolute difference image between said aligned current image frame and said previous image frame, and a second absolute difference image between said aligned next image frame and said current image frame.

4. The method as claimed in claim 3, wherein said determination of said first object contour further comprises detecting said first object contour corresponding to said first moving object in said first absolute difference image and said second absolute difference image.

5. The method as claimed in claim 4, wherein said determination of said first object contour further comprises determining a first object contour image based on said detected first object contour in said first absolute difference image, and a second object contour image based on said detected first object contour in said second absolute difference image.

6. The method as claimed in claim 5, wherein said determination of said first object contour further comprises determining an intermediate object contour image based on an intersection between said first object contour image and said second object contour image.

7. The method as claimed in claim 6, wherein said determination of said first object contour is based on said intermediate object contour image and gradient information associated with said intermediate object contour image.

8. The method as claimed in claim 1, wherein said first pixel value corresponds to a gray color, said second pixel value corresponds to a white color, and said third pixel value corresponds to a black color.

9. The method as claimed in claim 1, wherein said infilling of said first object contour further comprises assigning said second pixel value to a plurality of pixels having said third pixel value in said first OBB, based on a lack of detection of two adjacent pixels in said first OBB, wherein one of said two adjacent pixels has said third pixel value and other of said two adjacent pixels has said first pixel value.

10. The method as claimed in claim 1, further comprising creating a second OBB that encompasses a second object contour of a second moving object based on detection of said second moving object in said video content.

11. The method as claimed in claim 10, further comprising copying said second OBB to a second destination image frame at a second location, wherein said second destination image frame corresponds to said first destination image frame that comprises said first object mask for said first moving object.

12. The method as claimed in claim 11, further comprising generating a second object mask of said second moving object in said second OBB, wherein said second moving object in said second OBB is associated with said first object mask of said first moving object.

13. The method as claimed in claim 12, further comprising extracting said second moving object based on said second object mask.

14. A system, comprising:
a video processor configured to:
determine a first object contour of a first moving object in video content;
create a first Object Bounding Box (OBB) that encompasses said first object contour of said first moving object;
generate a first object mask for said first moving object in a first destination image frame based on infill of said first object contour in said first OBB, wherein for said infill of said first object contour, said video processor is configured to:
set a first pixel value in said first destination image frame;
extract color attributes from said first object contour such that a second pixel value is set in said first object contour, wherein said second pixel value is different from said first pixel value,
wherein said generation of said first object mask comprises:
detection of a first pixel with a third pixel value in said first OBB;
detection a second pixel, adjacent to said first pixel, with said first pixel value in said first destination image frame, wherein said third pixel value is different from said first pixel value and said second pixel value; and
assignment of said first pixel value to said first pixel based on said detection of said second pixel with said first pixel value;
copy said created first OBB that encompasses said first object to said first destination image frame at a particular location; and
extract said first moving object in said video content based on said first object mask.

15. The system as claimed in claim 14, wherein said video processor is further configured to detect said first moving object based on three consecutive image frames of said video content, wherein said three consecutive image frames comprise a previous image frame, a current image frame, and a next image frame.

16. The system as claimed in claim 14, wherein said first pixel value corresponds to a gray color, said second pixel value corresponds to a white color, and said third pixel value corresponds to a black color.

17. The system as claimed in claim 14, wherein said video processor is further configured to assign said second pixel value to a plurality of pixels with said third pixel value in said first OBB, based on a lack of detection of two adjacent pixels in said first OBB, wherein one of said two adjacent pixels has said third pixel value and other of said two adjacent pixels has said first pixel value, and wherein said infill of said first object contour further comprises said assignment of said second pixel value to said plurality of pixels.

18. The method as claimed in claim 1, wherein said first object mask is within said first object contour, and wherein said first object contour is in said first OBB.

19. The method as claimed in claim 1,
wherein said detection of said first pixel with said third pixel value and said assigning of said first pixel value to said detected first pixel begin from a boundary pixel of said first OBB, and wherein said detection of said first pixel with said third pixel value and said assigning of said first pixel value to said detected first pixel proceed in at least one direction until each of the pixels inside said first OBB and outside said first object contour is assigned with said first pixel value.

* * * * *